United States Patent Office 3,342,812
Patented Sept. 19, 1967

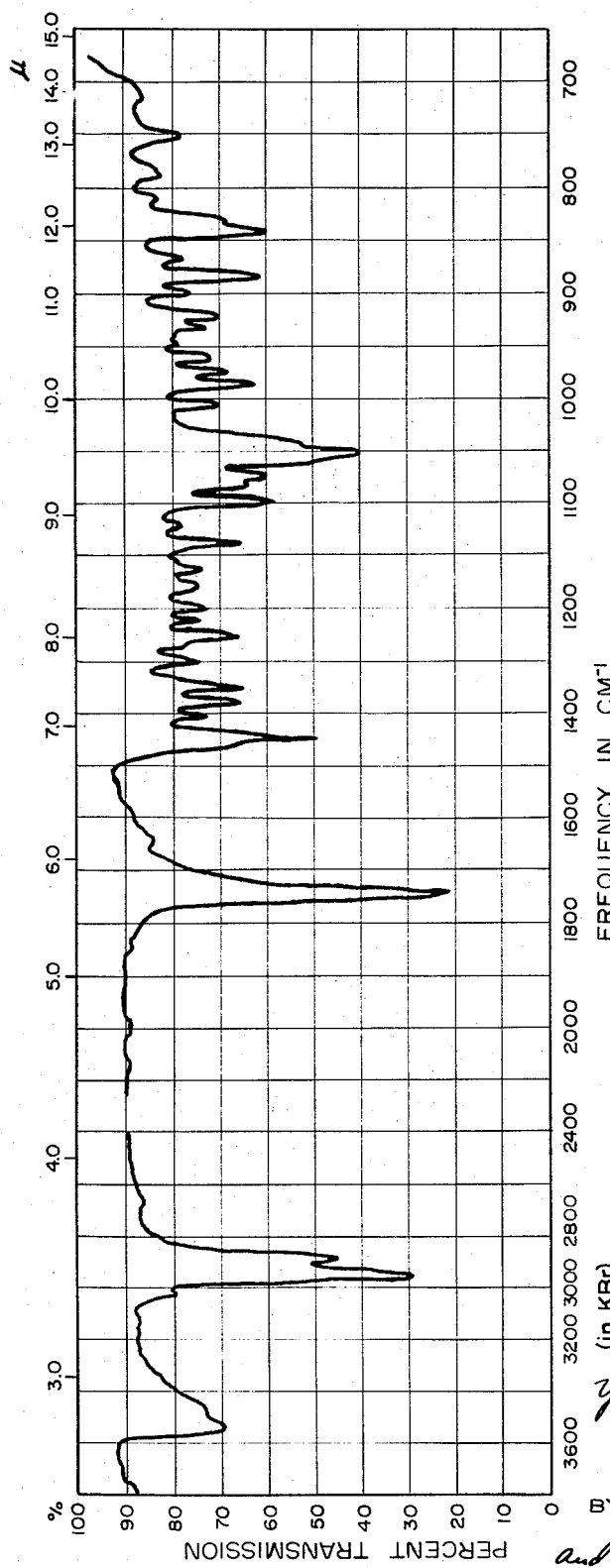

3,342,812
METHOD OF OBTAINING 3β-HYDROXY-14β,15β-EPOXY-5β-BUFA-20,22-DIENOLIDE
Manki Komatsu, Ichikawa, and Yoshiaki Kamano, Tokyo, Japan, assignors to Taisho Pharmaceutical Co., Ltd., Tokyo, Japan
Filed Dec. 31, 1964, Ser. No. 422,758
Claims priority, application Japan, July 22, 1964, 39/41,257
9 Claims. (Cl. 260—239.57)

ABSTRACT OF THE DISCLOSURE

3β - hydroxy - 14β, 15β - epoxy - 5β - bufa - 20,22-dienolide is recovered from Ch'an Su (senso) by extraction from aqueous solution followed by chromatography of the extract. The characteristic feature is that the aqueous solution is prepared by dissolution in water containing enzymic dissolution accelerator ("Vernase," pepsin, diastase), whereby high yields are readily realized.

---

The present invention relates to a novel method for obtaining 3β - hydroxy - 14β,15β - epoxy - 5β - bufa-20,22-dienolide from Ch'an Su.

The venom of the toad has long been recognized as having significant medical qualities. For centuries Chinese have treated toothache, sinusitis, and hemorrhages of the gums by external application of dark brown cakes of a preparation known as Ch'an Su made from the local toad *Bufo bufo gargarizans*. The preparation is frequently referred to as "dried venom of the Chinese toad." Ch'an Su is now commercially available as "senso" in the form of disks or plates.

The objective compound of the process of the present invention, namely, 3β - hydroxy - 14β,15β - epoxy - 5β-bufa-20,22-dienolide has the formula

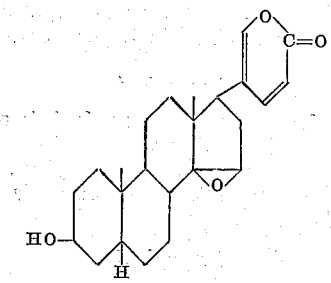

and is useful as a respiratory stimulant and as a hypertensor, e.g. as a first aid measure in the treatment of respiratory and circulatory disorders (respiratory depression, acute hypotension, circulatory insufficiency, asphyxia, hiccup, etc.). Administration is by very slow intravenous injection, the usual adult dose being 2 milligrams, e.g. in solution in 2 milliliters of 50% propylene glycol.

Considerable work has been done on the recovery of useful substances from Ch'an Su (or senso, which name will hereinafter be used); thus Kuno Meyer (University of Basel) isolated bufotalin therefrom. Moreover, a variety of methods have already been reported for obtaining 3β - hydroxy - 14β,15β - epoxy - 5β - bufa-20,22-dienolide from senso (cf. Helvetica Chimica Acta 40, 1292 [1959] and Japanese Patent No. 286,964).

Prior known methods for recovery of the last-mentioned objective compound from senso have been bound up with various inconveniences and difficulties, such as complicated and manifold operations; use of prejudicial heat and alkali, and consequent unsatisfactory yields; especially the uneconomical and time-consuming character of the procedure, e.g. repeated chromatography, required in order to recover the objective compound in reasonable purity. The necessity for many and repetitive and relatively complicated operations, with loss of material on each operation, inter alia because of the involvement of prejudicial conditions and reagents, inevitably leads to reduced yields.

The present invention is addressed to solving the problem of recovering 3β - hydroxy - 14β,15β - epoxy-5β-bufa-20,22-dienolide from senso, disks or plates, by an economically practicable method free of the disadvantages of the prior art procedures, i.e. free as far as possible from cumbersome and time-consuming procedures, entailing a minimum of procedural steps, avoiding prejudicial conditions and reagents, and affording the objective compound in a high state of purity as well as in high yield.

The aforesaid problem is resolved, according to the present invention, by the following expedients:

(a) the senso is first converted into the liquid phase;
(b) extraction of the liquid phase is effected by means of special extractants (solvents);
(c) the desired dienolide is recovered from the obtained extracts chromatographically with the aid of a particular type of sorbent.

It is found that this combination of special expedients yields the desired dienolide in superior quality and a minimum of loss.

Referring to the said expedients in greater detail:

(a) conversion into the liquid phase is accomplished by dissolving starting senso (in the solid cake form in which it is marketed) in about the ten-fold quantity by weight of water at 10 to 25° C. or ambient temperature;

(b) extraction of the desired compound from the resultant solution (liquid phase) of the senso, is achieved by means of an aromatic carbocylic hydrocarbon with a boiling point below about 150° C. (e.g. benzene, toluene, xylene, etc.), aliphatic chlorinated hydrocarbon (e.g. chloroform, trichloroethylene, etc.), ethyl acetate, and especially benzenechloroform mixture (5:1 by volume);

(c) recovery of 3β - hydroxy - 14β,15β - epoxy - 5β-bufa-20,22-dienolide from the combined extracts from (b) is effected by fractional column-chromatography of the latter, advantageously after concentration down to about one-third the volume thereof by distilling off the solvent, using activated alumina or synthetic magnesia silica gel (commercially available as activated magnesium silicate under the name Florisil), as the material of the column, and the solvent used under (b) or the aforesaid benzene-chloroform mixture (5:1 by volume) as the eluting agent.

A condition precedent to the use of expedients (b) and (c) is conversion into the liquid phase according to expedient (a). Unless this is done, the results achieved by the invention cannot be realized; thus it will not do to effect the extraction of the senso in the solid phase, even according to (b) and even if followed by purification according to (c).

Superior results are obtained if the material, i.e. sorption agent, of the column is of a size within the 100 to 300 mesh size, although other mesh sizes may be employed. Best results are, moreover, obtained if the column is dimensioned 1:30 (diameter to length); if the sorption agent (alumina or Florisil) is subjected to a preliminary washing with methanol; and if the said sorption agent has an activation degree of 3 to 4, namely, in good agreement with the activation which separates Sudan-yellow from Sudan-red, on the one hand, and Sudan-red from p-aminobenzene on the other hand.

Expedient (a) can be advantageously modified by effecting the dissolution of the initial senso in water containing a small quantity—e.g. a quantity of about one-tenth the weight of the senso—of enzyme, since this accelerates the dissolution of the latter. The enzyme may e.g. be an acid stable proteolytic and amolytic enzyme produced with the acid of *Aspergillus oryzae* TPR–18 (and commercially available as Vernase; cf. U.S. Patent No. 3,063,911); pepsin or diastase, etc. may also be employed.

The non-crystalline material obtained as the product of the chromatographic step after distilling off the solvent is converted into crystalline form by crystallization from acetone or aqueous acetone whereupon the product has double melting points of 135–137° C. and 165–168° C. Recrystallizaiton from acetone or aqueous acetone yields highly pure, plate - like 3β-hydroxy-14β,15β - epoxy-5β-bufa-20,22-dienolide of melting point 179–181° C., [α]=—5° (in chloroform); and having the infrared absorption spectrum as shown on the accompanying drawing.

The yield according to the present process ranges from 1.8 to 2.8% by weight relative to the starting material, which compares very favorably with the 1.8 to 2% yield from disk-like senso reported by K. Meyer in Helvetica Chimica Acta, 40, 1292 (1959).

The following table sets forth, by way of comparison, yields of intermediate extracts obtained by the conventional methods and by the method of this invention:

| Solvent | Conventional method,[1] percent | Method of this invention,[2] percent |
| --- | --- | --- |
| Benzene | 6.8 | 14.5 |
| Chloroform | 12.1 | 18.0 |
| Benzene-chloroform mixture (5:1 by volume) | 7.8 | 25.0 |
| Ethyl acetate | 9.62 | 17.6 |
| Cyclohexane | 1.43 | 2.0 |

[1] Extracting 3 times from senso with, each time, about 10-fold quantity of the solvent relative to the weight of senso, with shaking for 3 hours.
[2] Extracting 3 times from liquid phase senso with, each time, about 10-fold quantity of the solvent relative to the weight of senso, for 10 minutes (the "liquid phase" senso is obtained as described in Example 1, infra).

The following examples set forth presently preferred illustrative, but not limitative, embodiments of the invention. In these examples, parts by weight bear the same relation to parts by volume as do grams to milliliters.

*Example 1*

100 parts by weight of plate-like senso is dissolved in 1000 parts by volume of water, dissolution being completed in 30 minutes upon agitation of the mixture. The resultant solution (liquid phase senso) is then extracted directly three times with, each time, 1000 parts by volume of benzene-chloroform mixture (5:1 by volume), with agitation. The obtained extracts are combined and the whole is then heated to 50° C. under reduced pressure, the ensuing concentration being discontinued when the volume of the mixture is reduced to about one-third its original volume. The resultant concentrated extract is then subjected to chromatography on a column of 100 to 200 mesh alumina of activated degree 3, using about 50 times the volume of said activated sorbent relative to the volume of extract.

After the extract is poured and sorbed onto the column, elution is effected with benzene-chloroform mixture (5:1 by volume) whereupon there is obtained, as first eluate, some undesired sterols, and this is followed—upon continued elution with the same eluant—of a further eluate fraction containing the desired 3β-hydroxy-14β,15β-epoxy-5β-bufa-20,22-dienolide. The latter is recovered in non-crystalline form from the solution by distilling off the solvent mixture.

The so-obtained product is then crystallized from acetone (or aqueous acetone) to yield crystals having the double melting points of 135–137° C./165–168° C. Recrystallization from acetone (or aqueous acetone) yields plate-like crystalline, substantially pure 3β-hydroxy-14β,15β-epoxy-5β-bufa-20,22-dienolide of M.P. 179–181° C.; [α]=—5° (in CHCl₃). Yield: 2.8% by weight.

*Example 2*

100 parts by weight of crushed disk senso are added to 1000 parts by volume of water containing 10 parts by weight of acid stable proteolytic and amylolytic enzyme (produced from *Aspergillus oryza* TPR–18 according to U.S. Patent No. 3,063,911) and dissolution effected at ambient temperature with occasional agitation of the mixture.

The so-obtained solution (liquid phase senso) is then subjected to direct extraction with 1000 parts by volume of benzene, with occasional agitation of the mixture. The obtained benzene extract is then concentrated to one-third its volume by distilling off part of the benzene. The resultant concentrated solution is then subjected to chromatography on a column of 100 to 200 mesh size activated alumina (activation degree 4), using about 40 times by volume of said activated sorbent relative to the volume of concentrated solution.

After the concentrated solution is poured and sorbed onto the said column, elution is carried out with benzene as the eluting agent, whereupon elution takes place after the manner described in Example 1.

The obtained product is subjected to crystallization and recrystallization from acetone (or aqueous acetone) and 3β - hydroxy - 14β,15β - epoxy - 5β - bufa - 20,22-dienolide crystals, M.P. 179–181° C., are obtained in a yield of 2.3 parts by weight, i.e. with a recovery of 2.3% relative to the weight of the starting material.

*Example 3*

The method according to Example 1 is repeated except that trichloroethylene is used as the extracting solvent in place of benzene-chloroform mixture, in the same amounts as the latter. 3β-hydroxy-14β,15β-epoxy-5β-bufa-20,22-dienolide is obtained in a yield of 2.2 parts by weight.

*Example 4*

The method according to Example 2 is repeated except that the 1000 parts by volume of benzene are replaced by 1000 parts by volume of xylene. The 3β-hydroxy-14β,15β-epoxy-5β-bufa-20,22-dienolide is obtained in a yield of 1.8 parts by weight.

*Example 5*

The procedure according to Example 2 is followed except that 60 parts by volume of Florisil of 300 mesh size, pre-washed with methanol, are used in lieu of the activated alumina. The 3β-hydroxy-14β,15β-epoxy-5β-bufa-20,22-dienolide is obtained in a yield of 1.9 parts by weight.

*Example 6*

Example 2 is repeated with the modification that the acid stable proteolytic and amylolytic enzyme there employed is replaced by a corresponding quantity of pepsin. The 3β-hydroxy-14β,15β-epoxy-5β-bufa-20,22-dienolide is obtained in a yield of 2.4 parts by weight.

Having thus disclosed the invention, what is claimed is:

1. A method for recovering 3β-hydroxy-14β,15β-epoxy-5β-bufa-20,22-dienolide by solvent extraction from Ch'an Su, which comprises directly extracting with a solvent an aqueous solution of the Ch'an Su in the ten-fold quantity by weight of water containing one-tenth part by weight, relative to the weight of the dry Ch'an Su, of an enzymic dissociation accelerator, concentrating the so-obtained extract down to about one-third its original volume, pouring the resultant concentrated solution onto a chromatographic column of agent which is a selective sorbent for 3β - hydroxy - 14β,15β - epoxy - 5β - bufa - 20,22 - dienolide-fraction from said column by means of the aforesaid solvent, as eluting agent, distilling off the solvent from said fraction, and crystallizing the resultant 3β-hydroxy - 14β,15β - epoxy - 5β - bufa - 20,22 - dienolide-containing residue from acetone.

2. A method according to claim 1, wherein the enzymic accelerator is acid stable proteolytic and amylolytic enzyme.

3. A method according to claim 1, wherein the enzymic accelerator is pepsin.

4. A method according to claim 1, wherein the enzymic accelerator is diastase.

5. In a method for recovering 3β-hydroxy-14β,15β-epoxy-5β-bufa-20,22-dienolide by solvent extraction from an aqueous solution of Ch'an Su, the improvement according to which dissolution of the Ch'an Su is carried out in water containing enzymic dissolution accelerator.

6. The improvement according to claim 5, wherein the enzymic dissolution accelerator is present in a quantity of about one-tenth the dry weight of the Ch'an Su.

7. The improvement according to claim 5, wherein the enzyme is acid stable proteolytic and amylolytic enzyme.

8. The improvement according to claim 5, wherein the enzyme is pepsin.

9. The improvement according to claim 5, wherein the enzyme is diastase.

References Cited

Hofer et al., "Helv. Chim. Acta" (1960), pp. 1495–1507 relied on.

ELBERT L. ROBERTS, *Primary Examiner.*